United States Patent [19]

Chen et al.

[11] Patent Number: 5,510,457
[45] Date of Patent: Apr. 23, 1996

[54] METHOD FOR PREPARING PROCESSABLE POLYISOTHIANAPHTHENE

[75] Inventors: Show-An Chen, Hsinchu; Chin-Chang Lee, Tao, both of Taiwan

[73] Assignee: National Science Council, Taipei, Taiwan

[21] Appl. No.: 427,249

[22] Filed: Apr. 24, 1995

[51] Int. Cl.$^6$ ................................................. C08G 75/00
[52] U.S. Cl. .................. 528/378; 528/373; 528/377; 528/380; 528/403; 528/408; 528/418; 528/487; 528/490; 528/503; 252/500; 252/518; 549/1; 549/41; 525/189; 525/411; 525/414; 525/417; 525/535
[58] Field of Search .................. 528/373, 377, 528/378, 380, 403, 408, 418, 487, 490, 503; 252/500, 518; 549/1, 41; 529/189, 411, 414, 417, 535

[56] References Cited

U.S. PATENT DOCUMENTS

| | | | |
|---|---|---|---|
| 4,772,940 | 9/1988 | Wudl et al. | 358/59 |
| 4,789,748 | 12/1988 | Jen et al. | 548/58 |
| 4,795,242 | 6/1989 | Wudl et al. | 350/357 |

FOREIGN PATENT DOCUMENTS

| | | |
|---|---|---|
| 0269090 | 6/1988 | European Pat. Off. |
| 292855 | 12/1987 | Japan . |
| 196622 | 8/1988 | Japan . |
| 215772 | 9/1988 | Japan . |
| 193120 | 7/1990 | Japan . |
| 258832 | 10/1990 | Japan . |
| 252726 | 10/1990 | Japan . |
| 252727 | 10/1990 | Japan . |
| 258833 | 10/1990 | Japan . |

OTHER PUBLICATIONS

J. Org. Chem., 49, 3382 (1984) F. Wudl, M. Kobayashi, and A. Heeger.
Chemical and Engineering News, Dec., 3, 36 (1990) M. G. Kanatzidis.
J. Chem. Soc., Chem. Commun, 1618 (1991) T. Lyoda, M. Kitanio, and T. Shimidzu.
Synthetic Metals, 31, 395 (1989) T. L. Rose and M. C. Liberto.
Synthetic Metals, 36, 303 (1990) P. Chandrasekhar, A. M. Masulaitis and Ronald Winston Gumbs.
Synthetic Metals, 16, 379 (1986) K. Jen and R. L. Elsenbaumer.
Synthetic Metals, 47, 367 (1992) I. Hoogmartens, D. Vandersande, H. Martens, and J. Gelan.
J. Chem. Soc., Chem. Commun., 1672 (1992) M. Pomerantz, B. Chaloner–Gill, L. O. Harding, J. J. Tseng, and W. J. Pomerantz.
Abstracts of Cited Foreign References.

*Primary Examiner*—Samuel A. Acquah
*Attorney, Agent, or Firm*—Knobbe, Martens, Olson & Bear

[57] ABSTRACT

A method for preparing a processable polyisothianaphthene polymer includes steps of dissolving an isothianaphthene monomer in a solvent and introducing therein an initiator to initiate a polymerization reaction to produce a precursor of poly(dihydroisothianaphthene), dissolving thoroughly the precursor of poly(dihydroisothianaphthene) in the solvent in an appropriate ratio to obtain a poly(dihydroisothianaphthene) solution, proceeding a dehydrogenation reaction for the poly(dihydroisothianaphthene) solution by introducing a dehydrogenation agent to obtain a polyisothianaphthene microgel solution, and terminating the dehydrogenation reaction by introducing an inhibitor. This invention offers a simple, feasible, and economical way to prepare a large-area film with uniform film thickness, excellent stability, and good electrochromic, conducting, and mechanical properties.

11 Claims, 7 Drawing Sheets

METHOD FOR PREPARING PROCESSABLE POLYISOTHIANAPHTHENE

FIELD OF THE INVENTION

The present invention relates generally to a method for preparing a polyisothianaphthene (PITN) polymeric material, and more particularly to a method for preparing a processable polyisothianaphthene polymeric material possessing excellent electrochromic properties.

BACKGROUND OF THE INVENTION

Most of the undoped conjugated conducting polymers have wide energy gaps between the valence and conduction bands, which range from 1.5 to 3.0 eV. After conducting polymers having been doped, new energy states are developed within the band gap and the polarons and bipolarons are formed to lower the energy barriers and enhance the conductivities of the conjugated conducting polymers. Polyisothianaphthene (PITN) was firstly electrochemically synthesized and reported in 1984 by Wudl and Heeger et al. They obtained a band gap of 1.1 eV, which is the lowest band gap of organic polymers being disclosed in the art. At a neutral state, the conductivity of the PITN is about $10^{-2}$ S/cm$^2$, and the PITN is quite stable in air. After PITN being doped, the conductivity can reach a higher value of 50 S/cm2. In the meantime, the PITN changes its color from blue into colorless transparence or pale yellow. If the PITN polymer is doped by an electrochemical process, it will possess a reversible electrochromic property. The so-called "electrochromic property" is obtained firstly by utilizing a conducting polymer as a working electrode in a specific medium of an ion salt, and then applying a positive voltage between the working electrode and a counter electrode to electrochemically dope the working electrode. Two new energy states are developed between the valence and conduction bands. In other words, polarons and bipolarons are formed. Then a new peak at the region of low energy (or long wavelength) in the absorption spectrum for the conducting polymer is found. The intensity of the absorption peak in the original region decreases with the increase of the degree of doping whereas the intensity of the absorption in the new-formed low energy region increases. The phenomenon results in the color change of the PITN polymer. Therefore, when a PITN polymeric material, which is originally blue, is doped in an electrochemical reaction cell containing an electrolyte solution by applying a proper voltage thereto, the PITN will become colorlessly transparent or palely yellow. If a proper reversed voltage is applied, the PITN will change back into blue. When a voltage within a specific range is applied to the PITN, the electrochromic property is reversible. This is the reason why the PITN is utilized to fabricate electrochromic display (ECD) devices with sharp contrasts and sinart windows.

A traditional electrochromic display device contains a transparent conducting glass coated thereon an electrochromic conducting polymeric film as an anode, a metal sheet as a cathode, and an appropriate liquid or polymeric electrolyte as an electrolyte. When a proper voltage is applied between the anode and the cathode to proceed doping or dedoping, the color of the electrochromic conducting polymeric film can be controlled thereby. If a smart window is to be fabricated, a transparent conducting material has to be utilized as the cathode instead of the metal plate for light permeability. In general, the conventional conducting polymers utilized to manufacture ECDs, compared to liquid crystal displays (LCDs), have advantages of being able to be formed and adopted in large area without blind visual angle, but have shortages of slow response time, e.g. about 100 milliseconds for changing colors thereof. However, this response time is acceptable for a smart window. The response time of PITN is about 10 milliseconds and is faster than conventional conducting polymers, and the contrast between color changes of PITN is remarkable. Moreover, PITN has a capability of maintaining heat energy. For example, at day time in winter, transparent PITN film is permeable to the radiant heat from sun, and the temperature in a room can be raised by the incident sun light. At night, PITN film of a dark color prevents heat from escaping from a room in the form of infrared ray when the surroundings are at lower temperatures. The energy consumption is reduced. Therefore, the smart windows utilizing electrochromic PITN can also be called electrochromic thermal windows. Owing to the versatility of PITN, it is valuable to further apply PITN to various applications such as a coating material on anodes or cathodes of batteries and on the electrodes of the solar cells. Being utilized to manufacture a device, PITN has to be fabricated in the form of a film or a membrane. Most prior art adopts the electrochemical method to produce PITN films.

As mentioned in the foregoing, the first reported method for synthesizing PITN was presented by Wudl and Heeger et al. in 1984. Up to now, there are a large number of the related methods being developed. Let's have an overall review of those various published papers and disclosures as follows.

1. Polymerization of isothianaphthene (ITN):

a) Electrochemical method:

A PITN film is deposited on a working electrode by introducing ITN as a monomer into a solution of acetonitrile (ACN) in a reaction cell, adding tetraphenyl phosphorium salt as a conducting electrolyte therein, utilizing a conducting indium tin oxide glass plate or a platinum plate as a working electrode and another platium plate as a counter electrode, and then applying a proper current and voltage between the working and counter electrodes.

b) Photopolymerization method:

A PITN film is deposited on a glass by the irradiation of a 500W Xe light after the steps of introducing ITN as a monomer into an ACN solution in a reaction cell, adding tetrabutylammonium bromide as an electrolyte and carbon tetrachloride as an electron-pair acceptor therein, and immersing therein the glass.

c) Elimination of hydrogen from precursor of PITN:

PITN powders can be obtained by adopting methyl sulfonic acid as a cationic catalyst to polymerize ITN into poly(1,3-dihydroisothianaphthene) (PDHITN) in an anhydride dichloromethane solution, and then eliminating hydrogen in the back-bone from PDHITN by $SO_2Cl_2$ as a dehydrogenation agent.

d) Direct polymerization of ITN:

Powdered PITN precipitate is obtained by milizing 7,7, 8,8-tetracyanoquinodimethane (TCNQ), $H_2SO_4$, $AlCl_3$, or $CuCl_2$ as an oxidant to oxidatively polymerize ITN.

2. Polymerization of 1,3-dihydroisothianaphthene (DHITN):

a) Electrochemical polymerization:

A PITN film is deposited on a working electrode by introducing DHITN as a monomer into an ACN solution containing tetraethylammonium tetrafluoroborade ($Et_4NBF_4$), tetrabutylammonium tetrafluoroborade ($Bu_4NBF_4$), or tetrabutylammonium hexafluorophosphate (Bu$_4$NPF$_6$) as a conducting electrolyte, immersing an conducting indium tin oxide glass plate as a working electrode and a platium plate as a counter electrode therein, and applying a proper current and potential.

b) Chemical preparation:

PITN powders are obtained by adopting dry nitromethane as a solvent and introducing PITN as a monomer and FeCl$_3$ of the same equivalent therein under an environment of 50° C. in air, e.g. in the presence of oxygen.

3. Polymerization of 1,3-dihydroisothianaphthene-2-oxide (DHITNO):

a) PITN powders are obtained by polymerizing DHITNO in the presence of an oxidant of H$_2$SO$_4$ or a mixture of H$_2$SO$_4$ and CH$_2$Cl$_2$.

b) PITN powders are obtained by polymerizing DHITNO in the presence of an oxidant of n-chlorosuccinimide (NCS).

4. Polymerization of ITN with a long side chain:

This method includes steps of synthesizing a derivative of ITN with a long alkyl side chain or a heterocyclic compound similar to ITN as a monomer, polymerizing the monomer in chloroform in the presence of an oxidant of FeCl$_3$ and dry air at 50° C., dedoping the polymer in a hydrazine aqueous solution, precipitating the dedoped PITN in the form of black powders in methyl alcohol, and then dissolving the obtained black powders in chloroform to eliminate low molecular weight polymers (i.e., oligomers, whose molecular weights are less than 3500) therefrom by a dialysis process to obtain a product of either poly(5-decyl-isothianaphthene) (referred as Product I thereinafter) or poly(2,3-dihexylthieno-[3,4-b]pyrazine) (referred as Product II thereinafter) of dark blue or black high molecular weight powders. The product obtained thereby is further dissolved in an ordinary solvent, such as chloroform, to deposit a film on a substrate. Pomerantz et al. (J. Chem. Soc., Chem. Commun., 1672 (1992)) disclosed the processes for synthesizing and polymerizing the monomers of Product II. The monomers and the polymers of Product I are respectively shown as follows:

and the monomers and the polymers of Product II are respectively shown as follows:

5. U.S. Pat. No. 4,789,748 (1988) issued to K-Y. Jen et al. discloses a process for polymerizing 1,3-dihydroisothianaphthene (DHITN) in nitromethane in the presence of oxygen.

6. U.S. Pat. No. 4,772,940 (1988) issued to F. Wudl et al. discloses (1) an electrochromic display (ECD) comprising a main device of a PITN film grown on a transparent conducting medium as a working electrode by an electrochemical polymerization process wherein the film thickness of the PITN is ranged from 0.03–30 µm; (2) a PITN polymer being reversible for doping and dedoping processes wherein the structures before and after being doped are respectively shown as follows:

wherein either one of R$_1$ and R$_2$ is H, C$_m$H$_{2m+1}$ (m=1–5), OCH$_3$, or SCH$_3$, X is S, Se, or Te, Y$_-$ is ClO$_4^-$, BF$_4^-$, PF$_6^-$, AsF$_6^-$, SbF$_6^-$, AlCl$_4^-$, AlBr$_4^-$, FeCl$_4$—, CF$_3$SO$_3$—, or HSO$_4$—, Z=0.01–1, and n=5–500; (3) the solvent for manufacturing ECDs is a non-water solvent of a high dielectric constant, the concentration of the ion salt therein is ranged from 0.0001–10 mole/L, and the distance between two electrodes is 0.05–5 mm; (4) PITN is used for a coating material on the anode of the battery; and (5) the doped transparent PITN film is utilized as the surface electrode of the solar cell.

7. U.S. Pat. No. 4,795,242 (1989) issued to F. Wudl et al. discloses (1) a process for producing derivatives of the PITN which contains an oxygen atom on a side chain and is capable of alleviating the instability of highly doped PITN polymers; and (2) an electrochemical process for polymerizing the monomers of the derivatives into a polymeric film. The structures of the obtained undoped and doped derivatives of the PITN family are respectively as follows:

wherein $R_1$ is H, $C_mH_{2m+1}$ (m=1–8), $OCH_3$, or $SCH_3$, $R_2$ is H or $C_mH_{2m+1}$ (m=1–8), X is S, Se, or Te, $Y^-$ is $ClO_4^-$, $BF_4^-$, $PF_6^-$, $AsF_6^-$, $SbF_6^-$, $AlCl_4^-$, $AlBr_4^-$, $FeCl_4^-$, $CF_3SO_3^-$, or $HSO_4^-$, Z=0.01–1, and n=5–500.

8. Jap. Pat. No. 62,292,855 (1987) issued to T. Shinsuke et al. discloses a process for polymerizing ITN monomers to obtain transparent conducting PITN composite film incorporated with PVC, which includes steps of utilizing a PVC coated platinum plate as a working electrode, immersing the plate in an ACN solution containing ITN monomers and applying a current density of 5 mA/cm² to the solution.

9. Jap. Pat. No. 63,196,622 (1988) issued to U. Novuo et al. discloses an electrochemical process for the dehydrogenation of PDHITN in a solution containing $Bu_4NBr$ and $CH_2Cl_2$, by which PITN powders are obtained.

10. Eur. Pat. Appl. EP 269,090 (1988) issued to S. Toshiyuki et al. discloses a method for producing a transparent PITN film, which includes steps of synthesizing a PITN film on an electrode by an electrochemical process and then electrochemically doping the electrode in a polyphosphoric acid of 0.1 mole/mole-monomer unit. The transparency of the obtained PITN film can be preserved for over 30 days in argon.

11. Jap. Pat. No. 63,215,772 (1988) issued to S. Toshiyuki et al. discloses a method for producing a transparent conducting composite film, which includes steps of electrochemcially polymerizing ITN on a conducting ITO glass to grow a PITN film on an electrode, dedoping the polymerized PITN film, immersing the dedoped PITN film into a vinyl sulfuric acid aqueous solution, treating the resulting solution with an ultrasonic oscillator and, after being taken out from the aqueous solution, irradiating the film with a long-wavelength UV in air for 5 minutes. Then, a composite film is obtained, and the obtained composite film is electrochemically doped in an ACN solution containing $Et_4NClO_4$. The produced transparent composite film can keep its transparency and colorlessness for over 50 days in air.

12. Jap. Pat. No. 02,258,833 (1990) issued to F. Eiji discloses a method for producing a stable suspended PITN aqueous dispersion by oxidatively polymerizing ITN derivatives in the presence of anionic polymers and/or anionic surfactants, in which a $FeCl_3$ solution is dropwisely added to the ITN derivatives. The obtained PITN suspension solution is dialyzed to obtain a solution which is stable when stored at 5° to 20° C. for 3 months. Furthermore, the obtained dispersion is blended with a poly(vinyl acetate) emulsion and is deposited on a glass plate and dried to give a PITN and PVC composite film with light transmission of about 30% and conductivity of about $10^{-4}$ S/cm.

13. Jap. Pat. No. 02,258,832 (1990) issued to F. Eiji discloses a method for producing a stable suspended PITN aqueous dispersion similar to the method previously described but in the presence of cationic, nonionic, anionic and amphoteric polymers and/or cationic, nonionic and amphoteric surfactants instead. The obtained PITN suspension solution is stable when stored at 5° to 20° C. for 3 month. Furthermore, the obtained dispersion is blended with a poly(vinyl acetate) emulsion and is deposited on a glass plate and dried to give a PITN and PVC composite film with conductivity of about $10^{-3}$ S/cm.

14. Jap. Pat. No. 02,252,726 (1990) issued to F. Eiji discloses an electrochemical polymerization method for polymerizing ITN monomers each of which has a substitutional group containing at least 8 carbon atoms thereon in an ACN solution containing $Bu_4N_4Cl$ to obtain a PITN film of $10^{-2}$ S/cm. The obtained PITN film can be dissolved in the ordinary solvent for further processing.

15. Jap. Pat. No. 02,252,727 (1990) issued to F. Eiji discloses another electrochemical polymerization for polymerizing 5-cyanobenzo[c]thiophene monomers in an ACN solution containing $Bu_4N_4Cl$ to obtain a polymer film with conductivity of $10^{-2}$ S/cm and light transmission of 30%, and the light transmission is further improved to 65% when doped with $BuN_4ClO_4$. In comparison with a conventional PITN film similarly prepared, whose light transmission before and after doping are 10% and 40 respectively, the light transmission is improved due to an electronegative substitution group existing in the monomer and polymer of 5-cyanobenzo[c]thiophene.

16. Jap. Pat. No. 02,193,120 (1990) issued to O. Ryuichi discloses an electrochemical polymerization and a doping process to obtain transparent PITN films for manufacturing the conducting electrodes of liquid crystal displays (LCDs).

PITN, when utilized to manufacture the electrochromic electrodes of the electrochromic displays or the anodes of batteries, has to be produced in the form of thin film. The processes for producing films will profoundly affect the qualities for further applications. Those presently known processes can be categorized and commented as follows:

1. Electrochemical method: This method has advantages of rapid polymerization and good adhesion to the substrate, however, there are still several shortages such as (1) the monomers are unstable when polymerized so that accompanying side reactions could occur, e.g. the crosslinking reaction, which results in the obtained PITN film being insoluble in an ordinary solvent, (2) highly concentrated monomers are required for the polymerization and a very low degree of polymerization can be achieved, and (3) it is difficult to produce a polymeric film with a large area and a uniform thickness due to the limitations of the polymerization equipments.

2. Photochemical method: This method is capable of depositing a film on any ordinary transparent substrate by a simple equipment, however, there will be structural defects of about 9% upon polymerization and the yield of polymerization is very low.

3. Suspension polymerization method: This method is capable of forming stable suspended PITN in an aqueous phase without any pollution problem; however, it is feasible only to produce composite films and takes much time to proceed a dialysis to purify the obtained PITN solution, and its transparency is unacceptable for further applications.

4. Preparation of a soluble PITN with a long chain substitutional group: This method has advantages of depositing a film on an ordinary film by a simple coating process and the obtained film can be further dissolved by an ordinary solvent. This method, for example disclosed in Jap. Pat. No. 63,215,772 (1988) issued to S. Toshiyuki et al., has its superiority on the processing of PITN films to compete with other methods; however, it is difficult to synthesize long-chain substituted ITN monomers with this method. Moreover, it is necessary to utilize $FeCl_3$ as the polymerization agent, utilize hydrazine to dedope the obtained solution, and proceed a dialysis step to purify PITN. On the other hand, this method, for example disclosed in Jap. Pat. No. 02,252,726 (1990) issued to F. Eiji, has advantages of obtaining PITN films able to be redissolved in an ordinary solvent; however, it is also difficult to synthesize the long-chain substituted ITN monomers. The monomers have to be polymerized in an electrochemical process, and the yield of polymerization is so low that it causes a high manufacturing costs.

To overcome the above-mentioned shortages and difficulties, a feasible way is to modify the process by eliminating the possibility of forming defects, such as crosslinking, on the obtained film so that it can be soluble in an ordinary solvent for further processing. Based on these considerations, this invention offers a modified process for manufacturing a processable PITN film.

SUMMARY OF THE INVENTION

An objective of this invention is to disclose a method for preparing a processable PITN microgel solution to manufacture a PITN film of large area and uniform thickness deposited on a large area substrate by coating or casting and then drying.

Another objective of this invention is to disclose a method for preparing a processable PITN microgel solution with a high degree of polymerization and without utilizing any dialysis process to purify the obtained PITN, so that it is much more economical in costs and in time. Another objective of this invention is to disclose a method for preparing a processable PITN microgel solution to obtain a stable PITN microgel solution by utilizing pyridine to terminate the dehydrogenation reaction to prevent the PITN microgel solution from precipitation due to the aggregation or crosslinking of molecules.

Another objective of this invention is to disclose a method for preparing a processable PITN microgel solution to manufacture a PITN film or a composite PITN film possessing excellent conducting, electrochromic, and mechanical properties.

In accordance with the present invention, a method for preparing a processable polyisothianaphthene polymer as follows:

wherein either one of $R_1$ and $R_2$ is selected from a group consisting of hydrogen, alkyl group having one to eight carbon atoms, alkoxyl group having one to eight carbon atoms, alkyl sulfide group, cyanide group, chlorine, and bromine, X is one selected from a group consisting of S, Se, and Te, and n is an integer ranged from 5 to 500, comprising steps of:

(a) dissolving an isothianaphthene monomer having a formula as follows in a solvent wherein $R_1$, $R_2$, and X are the same as defined above, and introducing an initiator to initiate a polymerization reaction to produce a precursor of poly(dihydroisothianaphthene) having a formula as follows wherein $R_1$, $R_2$, X, and n are the same as defined above;

(b) dissolving thoroughly the precursor of poly(dihydroisothianaphthene) as a solute in the solvent in an appropriate ratio to obtain a poly(dihydroisothianaphthene) solution; (c) proceeding a dehydrogenation reaction for the poly(dihydroisothianaphthene) solution by introducing a dehydrogenation agent to obtain a polyisothianaphthene microgel solution, wherein the dehydrogenation agent is one selected from a group consisting of tert-butyl hypochlofite (tBHC) and sulfuryl chloride ($SO_2Cl_2$); and (d) terminating the dehydrogenation reaction by introducing an inhibitor.

In accordance with another aspect of the invention, the initiator can be a cationic initiator, and is preferably methyl sulfonate or Lewis acids for initiating the polymerization reaction of isothianaphthene.

In accordance with another aspect of the invention, the polymerization reaction of isothianaphthene is proceeded at a relatively low temperature which is preferably ranged from about $-150°$ C. to about $20°$ C.

In accordance with another aspect of the invention, the precursor of poly(dihydroisothianaphthene) dissolved in the solvent is in a solute-to-solvent ratio of 1 to 100 by weight. The solvent can be $CH_2Cl_2$, $CHCl_3$, chlorobenzene, dichlorobenzene, aryl halides, alkyl halides, or a mixture thereof.

In accordance with another aspect of the invention, the inhibitor is pyridine.

In accordance with another aspect of the invention, the step (b) is further auxiliarily performed by an ultrasonic oscillator.

In accordance with another aspect of the invention, a content of the dehydrogenation agent is ranged from about 0.5 to about 1.0 equivalent.

In accordance with another aspect of the invention, a reaction time for the dehydrogenation reaction is ranged from about 3 to about 30 minutes.

In accordance with another aspect of the invention, the precursor of poly(dihydroisothianaphthene) in the step (b) is further blended with a conventional polymer in a solution to form a mixture and then the mixture thereof is subjected to the dehydrogenation reaction to obtain a composite polymer. The precursor of poly(dihydroisothianaphthene) is preferably blended with the conventional polymer in a weight ratio of 5% to 40%. The conventional polymer can be a vinyl polymer, a polycarbonate, a polyester, a polysiloxane or a polyalkoxide respectively having the following formulas:

wherein X is one selected from a group consisting of hydrogen and methyl group, Y is one selected from a group consisting of hydrogen, methyl group, chlorine, cyanide group, alkyl ester group having one to six carbon atoms, phenyl group, and alkyl carbonyl group having one to six carbon atoms, either one of $R_3$ and $R_4$ is selected from a group consisting of aliphatic hydrocarbons and aromatic hydrocarbons, n is the same as defined above, and m is an integer ranged from 2 to 4. The conventional polymer is preferably polymethyl methacrylate or polybutyl methacrylate.

In accordance with another aspect of the invention, the composite film is further uniformly deposited on a substrate by a coating process or a casting process.

The present invention may be best understood through the following description with reference to the accompanying drawings, in which:

DETAILED DESCRIPTION OF THE PREFERRED EMBODIMENT

The primary feature of this invention is to obtain a stable PITN microgel solution via an improved dehydrogenation process for its precursor PDHITN. First of all, the precursor, PDHITN, is synthesized by dissolving ITN monomers in a solvent such as $CH_2Cl_2$, $CHCl_3$, chlorobenzene, dichlorobenzene, alkyl halides, aryl halides or a mixture thereof, and introducing therein a cationic initiator which can be methyl sulfonic acid or Lewis acids to proceed the polymerization of ITN at a relatively low temperature of about −150° C. to about 20° C. for about one hour. The polymerization is terminated by introducing pyridine and the precursor of PDHITN is obtained therefrom. The precursor of PDHITN is further dissolved in a solvent which can be $CH_2Cl_2$, $CHCl_3$, chlorobenzene, dichlorobenzene, alkyl halides, aryl halides or a mixture thereof, and is agitated by an ultrasonic oscillator for thorough dissolution to obtain a PDHITN solution. It is preferred to introduce nitrogen flow through the PDHITN solution to replace the dissolved air therein. The amount of added solvent is preferably about 1 to 100 ml for each milligram of the precursor, PDHITN. Otherwise, if the concentration of the precursor is too high, the product, PITN, will be too easy to precipitate after the dehydrogenation reaction; or if the precursor is too dilute, the dehydrogenation of PDHITN to form PITN will be incomplete and PITN will be difficult to form a desired film. Thereafter, the obtained PDHITN solution is subject to a dehydrogenation reaction by introducing tert-butyl hypochlorite (tBHC) or $SO_2Cl_2$ as a dehydrogenation agent for about 3 to 30 minutes. The amount of the introduced dehydrogenation agent is about 0.5 to 1.0 equivalent of the PDHITN solution. The dehydrogenation process is terminated by introducing pyridine as an inhibitor and a PITN microgel solution is obtained thereby. When deposited to a substrate such as a conducting induim tin oxide glass by coating or casting and then dried, the PITN microgel solution forms a desired PITN film. The obtained PITN polymeric film, if applied thereto a positive voltage, will change its color from blue into pale yellow or nearly colorless transparency; and if applied with a reversed voltage thereafter, will change its color back to blue. The color changes are reversible.

To reinforce the mechanical properties of the PITN film and its adhesion to the substrate, the PITN microgel solution can be further incorporated in a proper ratio with a conventional polymer such as polymethyl methacrylate (PMMA) or polybutyl methacrylate (PBMA) and agitated by an ultrasonic oscillator for thorough dissolution to obtain an incorporated PDHITN solution. The obtained incorporated solution is deposited on a substrate by coating or casting to produce a composite film thereon. The obtained composite film also possesses excellent electrochromic and mechanical properties. Both of the obtained PITN and composite films are suitable for manufacturing large area films for further applications in ECDs, smart windows, and transparent windows of instruments.

Figure 1:
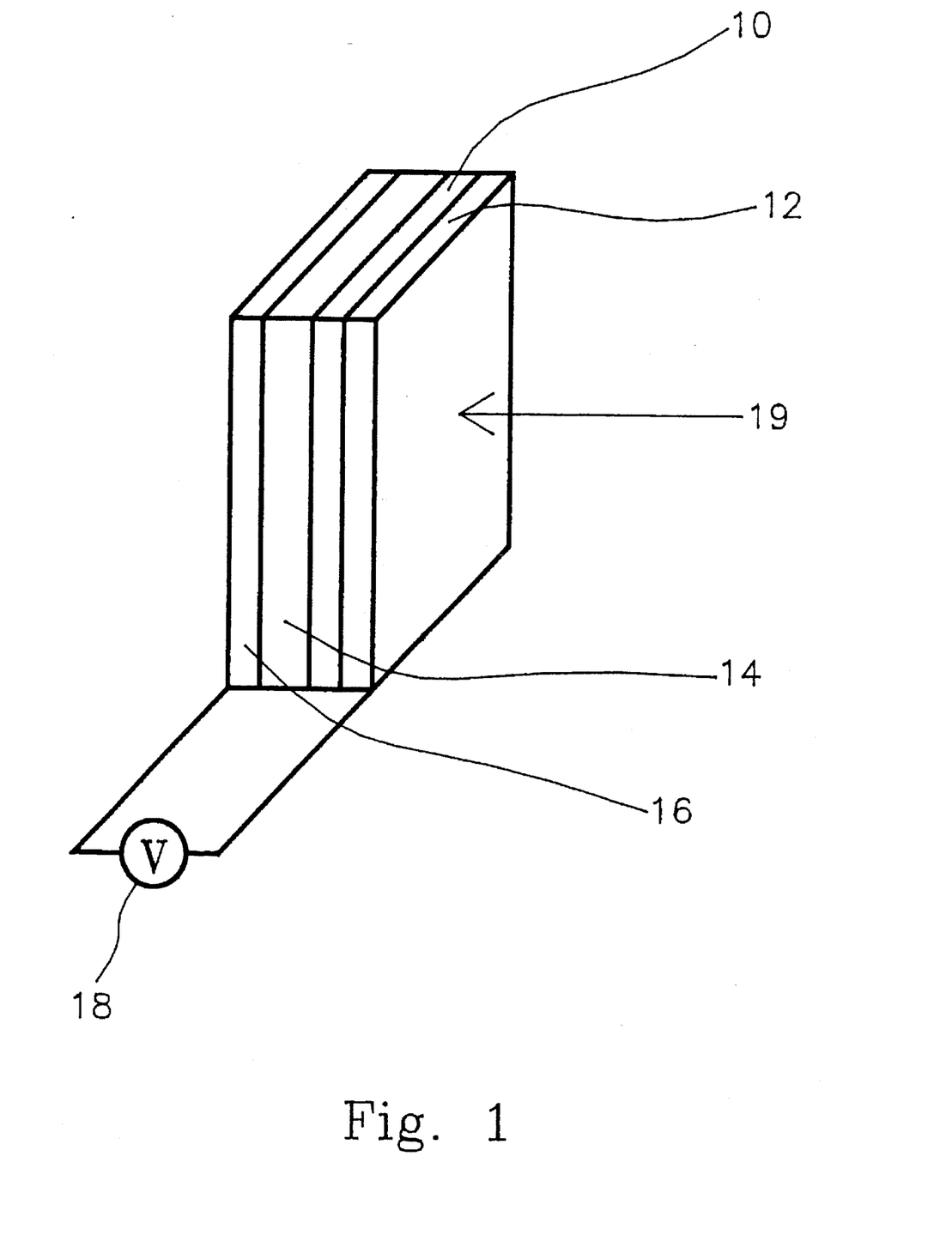
FIG. 1 is a schematic view of an electrochromic display device of this invention.

As shown in FIG. 1, an indium tin oxide glass 10 utilized as a cathode 10 is accordingly coated or casted with a layer of a conducting polymer 12 (PITN film in this invention), covered by a polymeric electrolyte film 14, and further connected to a metal anode 16 thereon. A power supply 18 is connected to the anode 16 and cathode 10 at both ends respectively. The changes in color of the conducting PITN polymers can be observed in the direction of arrow 19.

Figure 2:
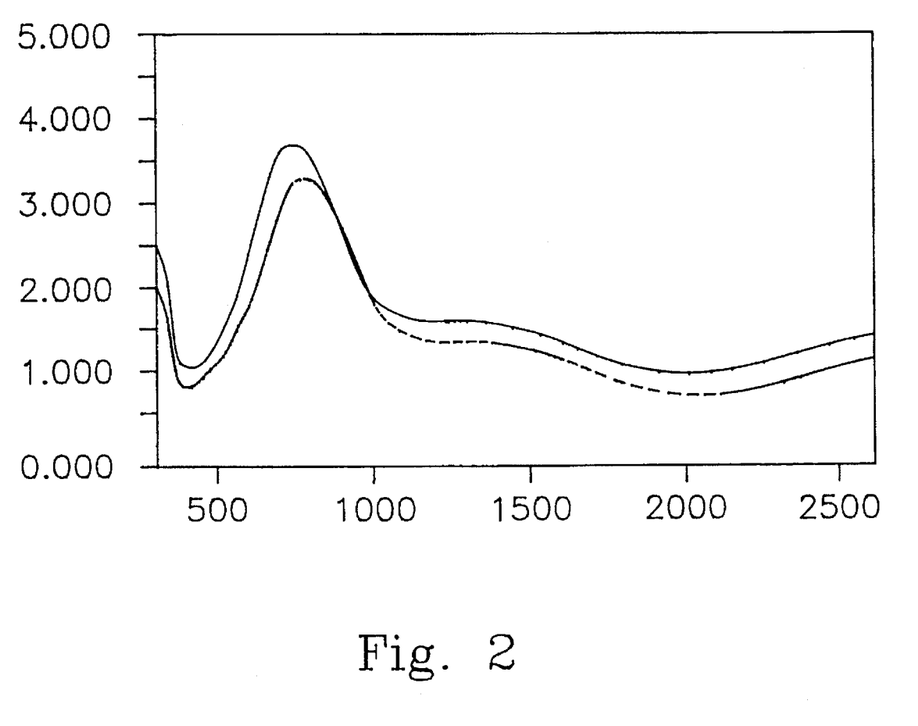
FIG. 2 is an UV-VIs-NIR spectrum diagram, wherein the ordinate represents the absorption intensity and the abscissa represents the wavelength.

The UV-Vis-NIR spectrum absorption diagram of this invention, as shown in FIG. 2 wherein the ordinate is the absorption intensity (A) and the abscissa is the absorption wavelength in the unit of nm, presents two curves of Curve 20 and Curve 22 which are experimental results of utilizing $SO_2Cl_2$ and tBHC respectively as dehydrogenation agent for eliminating hydrogen from PDHITN. In Curve 20, there are a π-π* absorption peak appearing at about 790 nm and a weaker but wider absorption peak appearing at about 1400 nm. It shows that there are still a few of PITN segments being doped. Although the minor doping can be eliminated by introducing a strong base such as hydrazine or tertiary amines as an inhibitor to terminate the dehydrogenation reaction, the obtained solution is unstable and PITN therein will aggregate immediately to form powders suspended in the solution. An alternative inhibitor is pyridine by which a stable PITN solution is obtained.

However, the residues of pyridine and $SO_2Cl_2$ incorporated in the obtained PITN will form a salt embedded in the film, causing a cracked appearance on the film that makes the obtained PITN film unsuitable for manufacturing ECDs. To overcome those shortages, the obtained PITN solution is further incorporated with a conventional polymer. Through this modification, the obtained PITN composite film have smooth surface and improved mechanical properties, yet possesses excellent electrochromic property.

The other candidate for eliminating hydrogen from PDHITN is tert-butyl hypochlorite (tBHC) which provides a faster rate of dehydrogenation with producing less unwanted by-products, e.g., the generated HCl is about a half amount of that obtained HCl by utilizing $SO_2Cl_2$. The other by-product is tert-butyl alcohol which is inert to doping and is able to hinder coupling of radicals generated by doping during the dehydrogenation of PDHITN. In Curve 22, there are a $\pi$-$\pi$* absorption peak appearing at about 810 nm and a weaker but wider absorption peak appearing at about 1400 nm. It shows that the extent of dehydrogenation by tBHC is higher than that by $SO_2Cl_2$ as reflected in the red shift by 20 mn of the maximum peak in Curve 22 over that in Curve 20, and there are still a few of PITN segments being doped. By introducing pyridine as an inhibitor, the obtained PITN solution remains stable without any further precipitation due to chain aggregation.

Compared to the maximum absorption peak occurred at a lower wavelength ranging from 633 to 750 nm as disclosed in the prior references, this invention can indeed provide efficient and rapid dehydrogenation from PDHITN to obtain PITN with longer conjugate chains.

Either tBHC or $SO_2Cl_2$ utilized as a dehydrogenation agent in this invention is further suitable for eliminating hydrogen from a PDHITN polymer containing a substitutional group. However, the dehydrogenation agent will predominantly react with the substituent group to form a complex if the substituent group contains an activated hydrogen base group, such as —OH, —SH, —COOH, —$NH_2$, or —$NR_2$.

The present invention will now be described more specifically with reference to the following examples. It is to be noted that the following descriptions of examples including prefected embodiments of this invention are presented herein for the purpose of illustration and description. It is not intended to be exhaustive or to limit the precise form disclosed.

EXAMPLE 1

Preparation of PITN Film

Figure 3:
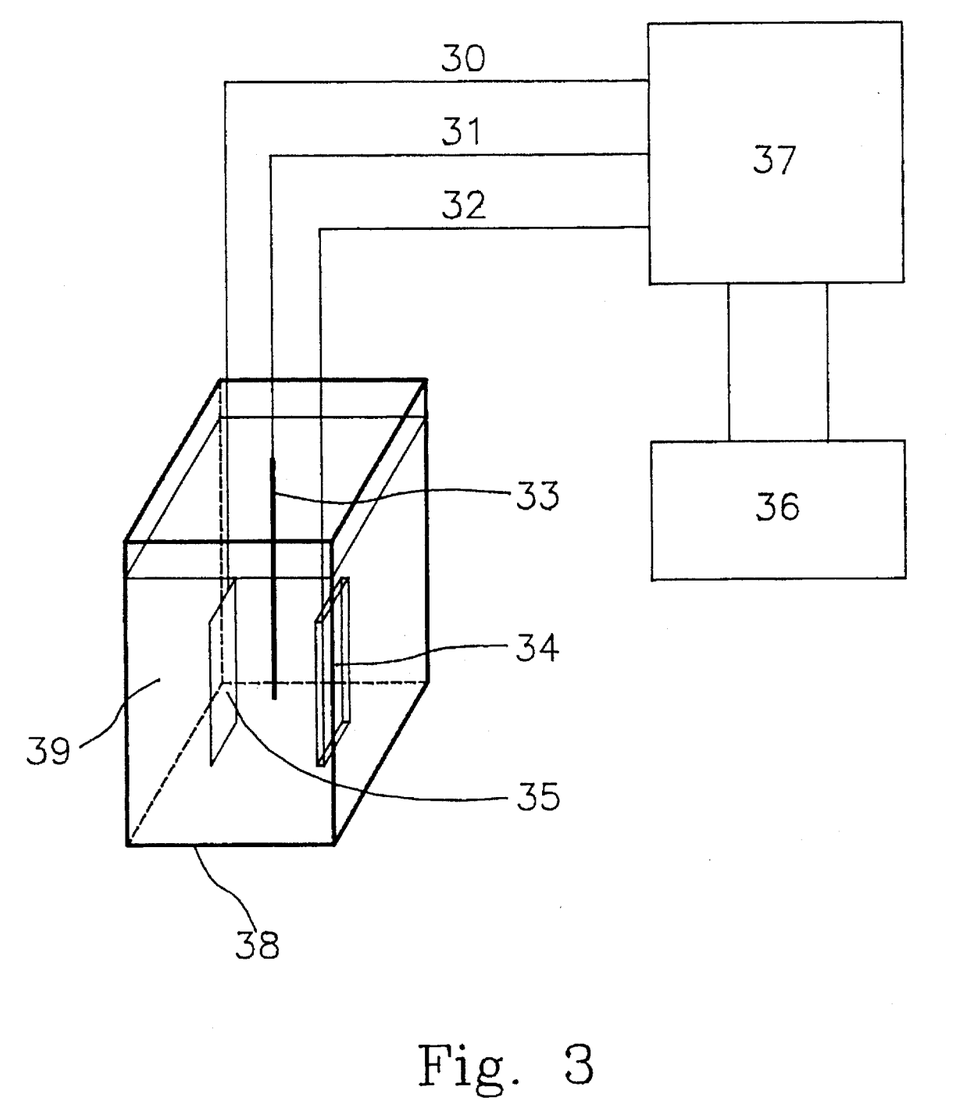
FIG. 3 is a schematic view of a cyclic voltammetry equipment.

Dissolve 20 mg PDHITN in 18 ml dichloromethane auxiliarily by an ultrasonic oscillator. The well-dissolved solution is introduced by a dichloromethane solution of 2 ml containing an equivalent (i.e. 18 µl) of tBHC to proceed a dehydrogenation process at room temperature for about 15 minutes. Thereafter, 0.5 ml pyridine is introduced to terminate dehydrogenation to obtain a PITN solution. Being deposited uniformly on a conducting ITO glass and dried, the PITN solution forms a film on the ITO glass. If the obtained PITN film is preserved in propylene carbonate (PC), it will keep its stability for months. The obtained PITN film is subject to detection via a cyclic voltammetry (CV) study as shown in FIG. 3 which is a schematic view of a cyclic voltammetry (CV) equipment comprising a counter electrode 30, a reference electrode 31, a working electrode 32, a silver wire 33, a conducting ITO glass 34 coated by PTIN thereon, a platinum plate 35, a power supply 37, a V-I recorder 36, a glass cell 38, and an electrolyte 39. This equipment is utilized to obtain a CV-curve from which the oxidization and reduction potentials can be obtained.

Figure 4:
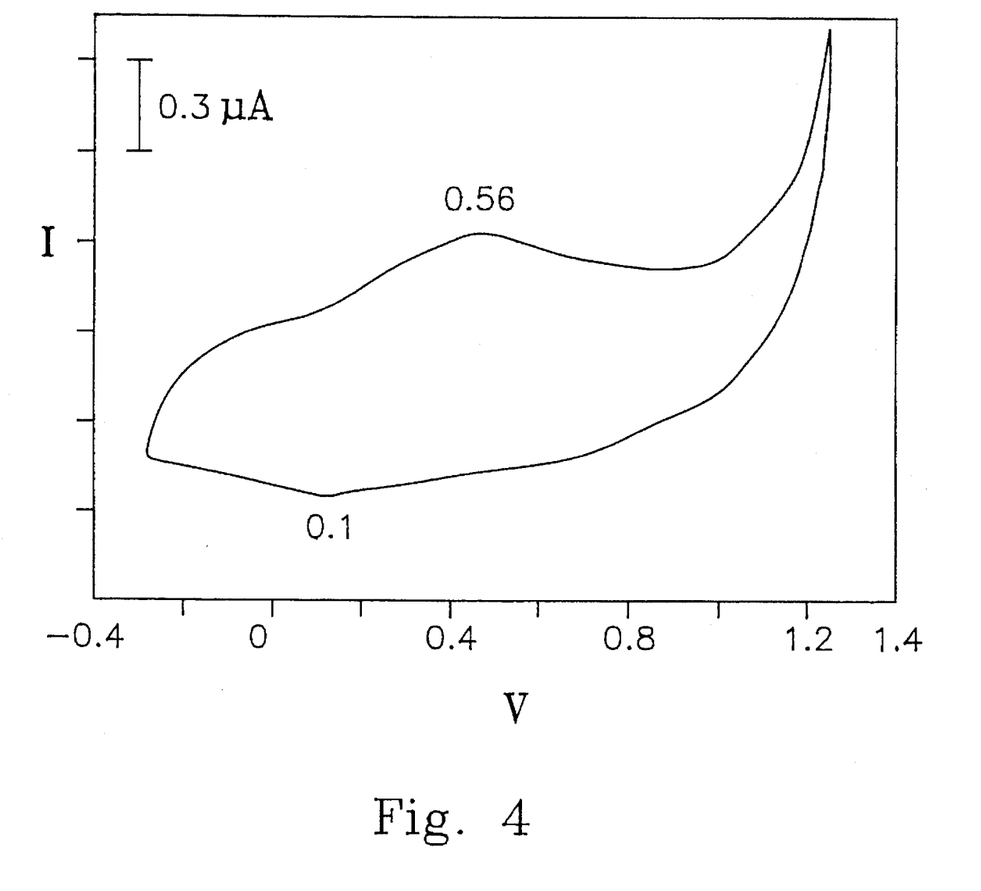
FIG. 4 is an I-V diagram from the cyclic voltammetry test, wherein the ordinate represents the current and the abscissa represents the voltage.

The PITN film is coated on a conducting ITO glass as a working electrode, a platinum plate is placed 5 mm away from the working electrode as a counter electrode, a silver wire is inserted as a reference electrode, and a PC solution containing 0.2 M $Et_4NBF_4$ is added as an electrolyte solution. The resulting CV-curve in FIG. 4 shows that the oxidization and reduction potentials are about 0.56 and 0.1 Volt respectively which are close to the results in the U.S. Pat. No. 4,772,940 (1988) issued to F. Wudl et al., which are 0.58 and −0.15. The reduction potential according to the present invention occurred 0.25 Volt earlier. It means that the obtained PITN in this invention is much easier to be dedoped or reduced than ever.

EXAMPLE 2

Preparation of PITN Composite Film

Dissolve 20 mg PDHITN and 180 mg PBMA in 18 mg dichloromethane with agitation using an ultrasonic oscillator for about 30 minutes. The obtained solution is subject to a dehydrogenation reaction when 2 ml dichloromethane solution containing 12 µl $SO_2Cl_2$ or 18 µl tBHC is introduced for about 15 minutes. The dehydrogenation reaction is terminated by introducing pyridine as an inhibitor to obtain a solution of PITN and PBMA, in which the weight ratio of the polymer is 1/9. The obtained incorporated solution is further deposited on a conducting ITO glass and dried to obtain a dark blue composite film.

EXAMPLE 3

Testing on the Electrochromic Properties of a PITN Film

Figure 5:
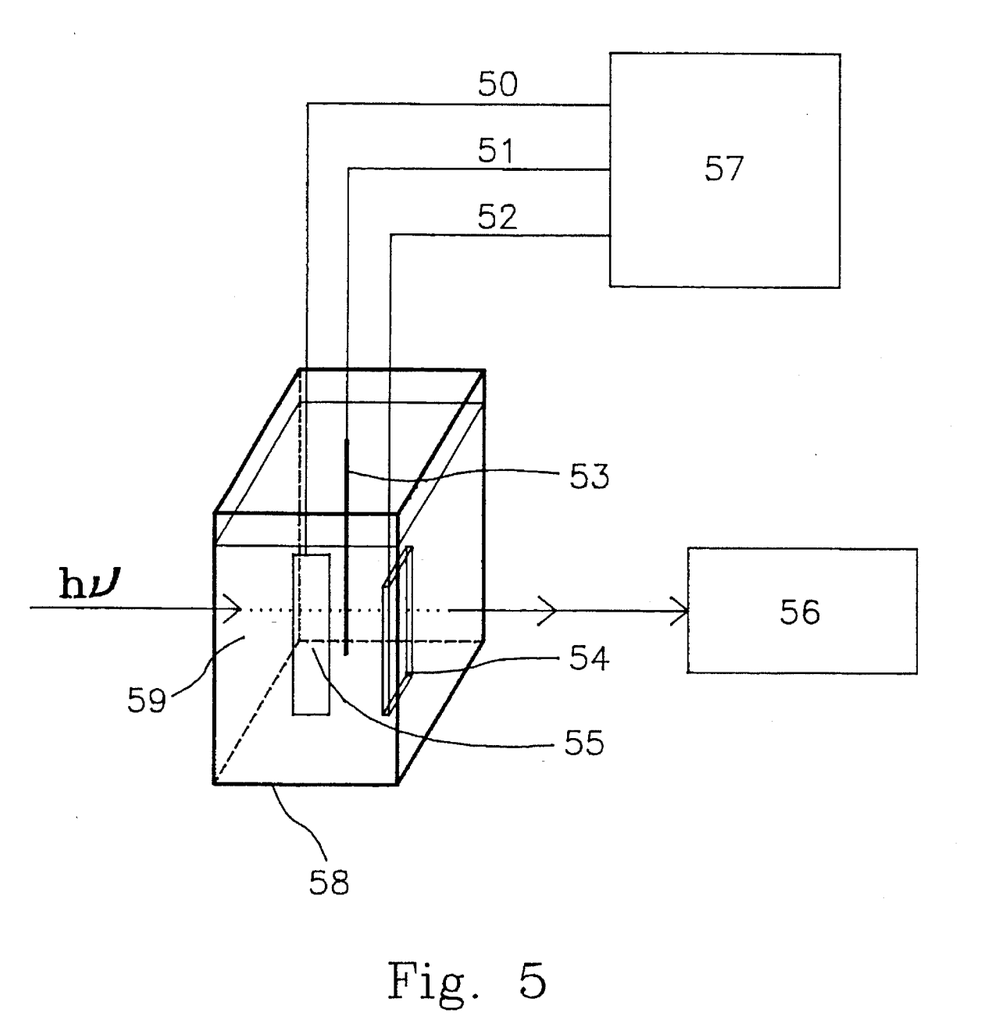
FIG. 5 is a schematic view of an UV-Vis-NIR electrochromic detecting system.
Figure 6:
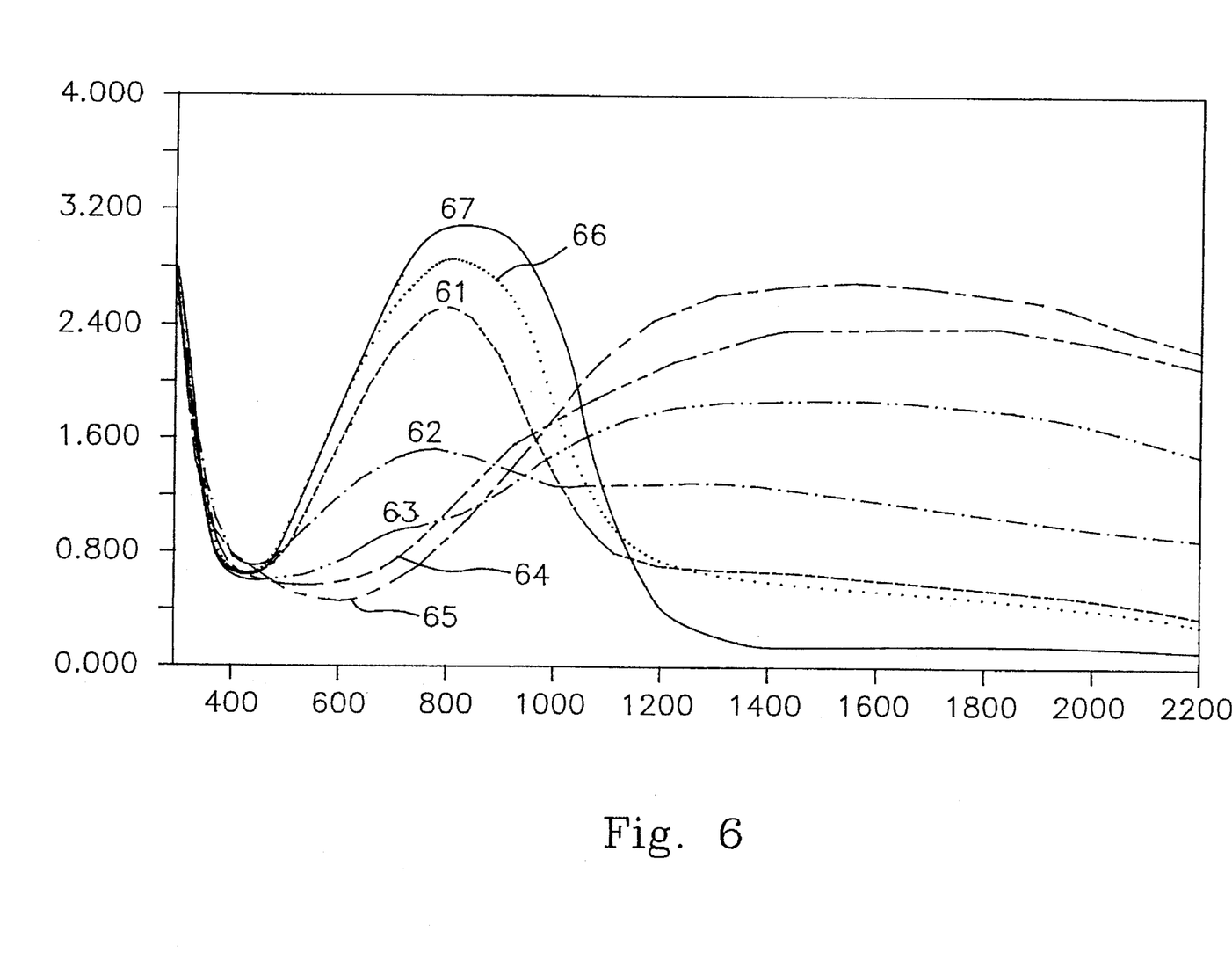
FIG. 6 is an electrochromic UV-Vis-NIR spectrum diagram of a polyisothianaphthene polymer.

Drop 0.5 ml of the obtained PITN solution from Example 1 on a 30 mm×9 mm conducting ITO glass and allow to dry to obtain an electrochromic film. Immerse the obtained electrochromic film as a working electrode, a platinum plate as a counter electrode and a silver wire as a reference electrode in a PC solution of 0.2M $Et_4NBF_4$. The set-up for testing the electrochromic property of the obtained PITN film is shown in FIG. 5, which is an UV-Vis-NIR electrochromic detecting system including a counter electrode 50, a reference electrode 51, a working electrode 52, a silver wire 53, a conducting ITO glass 54 coated with a semiconductor thereon, a platinum plate 55, a power supply 57, an UV-Vis-NIR detector 56, a quartz cell 58, and an electrolyte solution 59. This set-up is able to record the changes of the absorption spectrum in response to different applied voltages. When a voltage between the working and counter electrodes is applied such that the potential of the working electrode is 0.2 V relative to the reference electrode, the film gradually changes its color from dark blue into pale blue. When the potential is increased to 0.6 V, the color immediately changes into pale yellow or nearly colorless transparency. If the applied voltage is removed, the color gradually changes back to pale blue; and if the applied voltage is reversed, the color changes back to dark blue. The results are shown in FIG. 6 wherein Curves 61–67 are obtained by applying the voltage 0 V, 0.2 V, 0.4 V, 0.6 V, 1.0 V, −0.1 V, and −0.3 V respectively. These results also show that when a positive voltage is applied, the intensity of $\pi$-$\pi$* absorption peak at 810 nm decreases and that of the generated broad peak at 1400 nm with increasing the applied voltage. When a reversed voltage is applied, the absorption spectrum is restored to its original. Therefore, the obtained electrochromic PITN film can be applied for smart windows, ECDs, and observing windows of instruments.

EXAMPLE 4

Testing on the Electrochromic Property of a Composite Film Derived from a PITN Derivative

Figure 7:
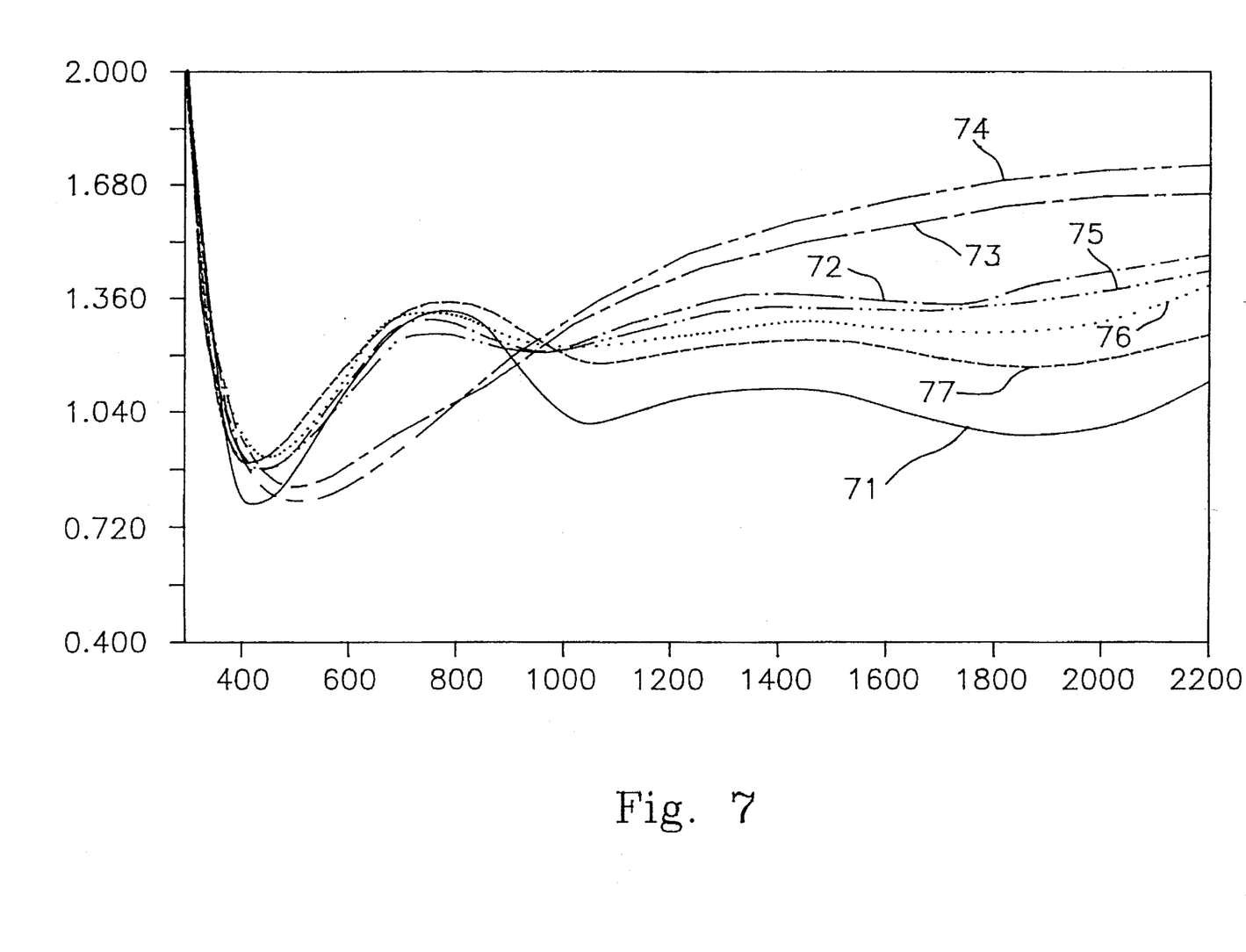
FIG. 7 is an electrochromic UV-Vis-NIR spectrum diagram of a composite polymer of PITN and PBMA.

Dissolve 20 mg poly(1,3-dihydro-5,6-dimethylisothianaphthene) and 180 mg PBMA in 18 ml anhydride dichloromethane with agitation using an ultrasonic oscillator for about 10 minutes. The obtained solution is subject to a dehydrogenation reaction by introducing 2 ml dichloromethane containing 7.5 μl $SO_2Cl_2$ as a dehydrogenation agent and allowing the reaction to proceed for 3 minutes and then terminating the reaction by introducing 0.5 ml pyridine as an inhibitor to obtain a solution of poly(1,3-dihydro-5,6-dimethylisothianaphthene) and PBMA with the weight ration 1/9. The resulting solution can remain stable for over one month at −20° C. A dark blue composite film is obtained by casting the solution on a conducting substrate such as an indium tin oxide glass. Through a test similar to that in Example 3, a spectrum diagram shown in FIG. 7 is obtained wherein Curves 61–67 are obtained by applying the voltage 0 V, 0.2 V, 0.4 V, 0.6 V, 1.0 V, −0.1 V, and −0.3 V respectively.

This invention is assured by the above-mentioned descriptions and examples that this invention offers a process of a good yield of polymerization by utilizing a dehydrogenation agent of tBHC or $SO_2Cl_2$ and a inhibitor of pyridine. The obtained polymers or composite materials of PITN thereby possess excellent electrochromic and mechanical properties and are capable of being cast on large substrates to obtain large-area polymer or composite films for practical applications.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a processable polyisothianaphthene polymer as follows:

wherein either one of $R_1$ and $R_2$ is selected from a group consisting of hydrogen, alkyl group having one to eight carbon atoms, alkoxyl group having one to eight carbon atoms, alkyl sulfide group, cyanide group, chlorine, and bromine, X is one selected from a group consisting of S, Se, and Te, and n is an integer ranged from 5 to 500, comprising steps of:

(a) dissolving an isothianaphthene monomer having a formula as follows in a solvent wherein $R_1$, $R_2$, and X are the same as defined above, and introducing an initiator to initiate a polymerization reaction to produce a precursor of poly(dihydroisothianaphthene) having a formula as follows wherein $R_1$, $R_2$, X, and n are the same as defined above;

(b) dissolving thoroughly said precursor of poly(dihydroisothianaphthene) as a solute in said solvent in an appropriate ratio to obtain a poly(dihydroisothianaphthene) solution;

(c) proceeding a dehydrogenation reaction for said poly(dihydroisothianaphthene) solution by introducing a dehydrogenation agent to obtain a polyisothianaphthene microgel solution, wherein said dehydrogenation agent is one selected from a group consisting of tertbutyl hypochlorite (tBHC) and sulfuryl chloride ($SO_2Cl_2$); and (d) terminating said dehydrogenation reaction by introducing an inhibitor.

2. A method for preparing a processable polyisothianaphthene polymer as claimed in claim 1, wherein said initiator is a cationic initiator.

3. A method for preparing a processable polyisothianaphthene polymer as claimed in claim 1, wherein said initiator is one selected from a group consisting of methyl sulfonate and Lewis acids.

4. A method for preparing a processable polyisothianaphthene polymer as claimed in claim 1, wherein said polymerization reaction of isothianaphthene is proceeded at a relatively low temperature.

5. A method for preparing a processable polyisothianaphthene polymer as claimed in claim 4, wherein said relatively low temperature is ranged from about −150° C. to about 20° C.

6. A method for preparing a processable polyisothianaphthene polymer as claimed in claim 1, wherein said precursor of poly(dihydroisothianaphthene) dissolved in said solvent is in a solute-to-solvent ratio of 1 to 100 by weight.

7. A method for preparing a processable polyisothianaphthene polymer as claimed in claim 1, wherein said solvent is one selected from a group consisting of $CH_2Cl_2$, $CHCl_3$, chlorobenzene, dichlorobenzene, and a mixture thereof.

8. A method for preparing a processable polyisothianaphthene polymer as claimed in claim 1, wherein said inhibitor is pyridine.

9. A method for preparing a processable polyisothianaphthene polymer as claimed in claim 1, wherein said step (b) is further auxiliarily performed by an ultrasonic oscillator.

10. A method for preparing a processable polyisothianaphthene polymer as claimed in claim 1, wherein a content of said dehydrogenation agent is ranged from about 0.5 to about 1.0 equivalent.

11. A method for preparing a processable polyisothianaphthene polymer as claimed in claim 1, wherein a reaction time for said dehydrogenation reaction is ranged from about 3 to about 30 minutes.

* * * * *

UNITED STATES PATENT AND TRADEMARK OFFICE
CERTIFICATE OF CORRECTION

PATENT NO. : 5,510,457
DATED : April 23, 1996
INVENTOR(S) : Show-An Chen, et. al.

It is certified that error appears in the above-indentified patent and that said Letters Patent is hereby corrected as shown below:

Column 8/between line 13 to 20, delete "  " and replace with --  --;

UNITED STATES PATENT AND TRADEMARK OFFICE
CERTIFICATE OF CORRECTION

PATENT NO. : 5,510,457                    Page 2 of 2
DATED      : April 23, 1996
INVENTOR(S) : Show-An Chen, et. al.

It is certified that error appears in the above-indentified patent and that said Letters Patent is hereby corrected as shown below:

Column 14/between line 20 to 26, delete "  " and replace with --  --.

Signed and Sealed this

Eleventh Day of March, 1997

Attest:

BRUCE LEHMAN

Attesting Officer        Commissioner of Patents and Trademarks